United States Patent [19]
Horikoshi

[11] Patent Number: 5,596,482
[45] Date of Patent: Jan. 21, 1997

[54] STOWABLE, PIVOTALLY ATTACHED PALM REST AND HANDLE FOR A NOTEBOOK COMPUTER

[75] Inventor: Seita Horikoshi, Zama, Japan

[73] Assignee: International Business Machines Corporation, Armonk, N.Y.

[21] Appl. No.: 532,345

[22] Filed: Sep. 22, 1995

[30] Foreign Application Priority Data

Sep. 22, 1994 [JP] Japan ..................... 6-228295

[51] Int. Cl.⁶ ............................... G06F 1/16; H05K 7/16
[52] U.S. Cl. ..................... 361/683; 361/680; 400/715; 248/118.1; 364/708.1
[58] Field of Search ..................... 361/680, 681, 361/683; 364/708.1; 400/715; 248/118, 118.1, 118.2, 118.3, 118.4, 118.5; G06F 1/16

[56] References Cited

U.S. PATENT DOCUMENTS 5,247,285  9/1993  Yokota et al. ..................... 345/169
5,347,630  9/1994  Ishizawa et al. ..................... 395/164
5,443,320  8/1995  Agata et al. ..................... 400/715

*Primary Examiner*—Leo P. Picard
*Assistant Examiner*—Lynn D. Feild
*Attorney, Agent, or Firm*—Martin J. McKinley

[57] ABSTRACT

Disclosed is a palm rest with a simple structure that can be stored in a lid of an electric device. A palm rest 10 is supported rotatable at a case assembly 14 within which a keyboard 34 is mounted. By rotating the palm rest 10 outward, an operator can rest his palms on it, thus facilitating key manipulation. When the palm rest 10 is positioned upright, it is retained within a lid 18, which covers the keyboard 34. In this case, the palm rest 10 does not project outward from the PC 12 and the PC 12 can therefore be stored without difficulty. Since a gap is defined between the palm rest 10 and the front wall of the case assembly 14 when the palm rest 10 is rotated forward, a user can slip his fingers through the defined gap and grasp the palm rest 10, which then can serve as a handle for carrying the PC 12.

8 Claims, 9 Drawing Sheets

5,596,482

STOWABLE, PIVOTALLY ATTACHED PALM REST AND HANDLE FOR A NOTEBOOK COMPUTER

BACKGROUND OF THE INVENTION

Applicant claims the foreign priority benefits under 35 U.S.C. 119 of Japanese Application No. 6-228295, which was filed Sep. 22, 1994. This Japanese Application and its translation are incorporated by reference into this Application.

This invention pertains to computer keyboard palm rests and, more particularly, to a palm rest that is pivotally attached to a notebook or other computer, that is stowable within the cover of the computer, and that also functions as a carrying handle.

Computer keyboard palm rests are used to improve the key input operation and, in some instances, to facilitate the carrying of the computer. One such palm rest can be slidably stored in a housing wherein a keyboard is mounted. This type of stowable palm rest is mounted on a slide mechanism that is provided on a side wall that extends from the front to the rear of the housing, and both ends of the palm rest are supported on the slide such that the palm rest can be extracted from and retracted within the housing.

However, it is relatively expensive to manufacture a slidable palm rest because the slide mechanism must be formed of a plastic material that slides easily, because precise manufacturing is required, and because there are a significant number of individual parts in a slidable palm rest mechanism. There are also other disadvantages to a slidable palm rest. For example, the slide mechanism must have a predetermined mechanical strength in order to be used as a handle for carrying the computer, a slide mechanism cannot be provided at the front side of the housing (the key operator side), and the palm rest must be lengthened in the direction of the width of the housing so that it extends beyond the portion where the palms of a key operator are normally positioned (beyond the typing area).

SUMMARY OF THE INVENTION

It is an object of the present invention to provide a simplified structure for a palm rest that can be enclosed within the cover of a computer and that does not extend beyond the usable width of the computer's keyboard.

DESCRIPTION OF THE ILLUSTRATIVE EMBODIMENTS

Figure 1:
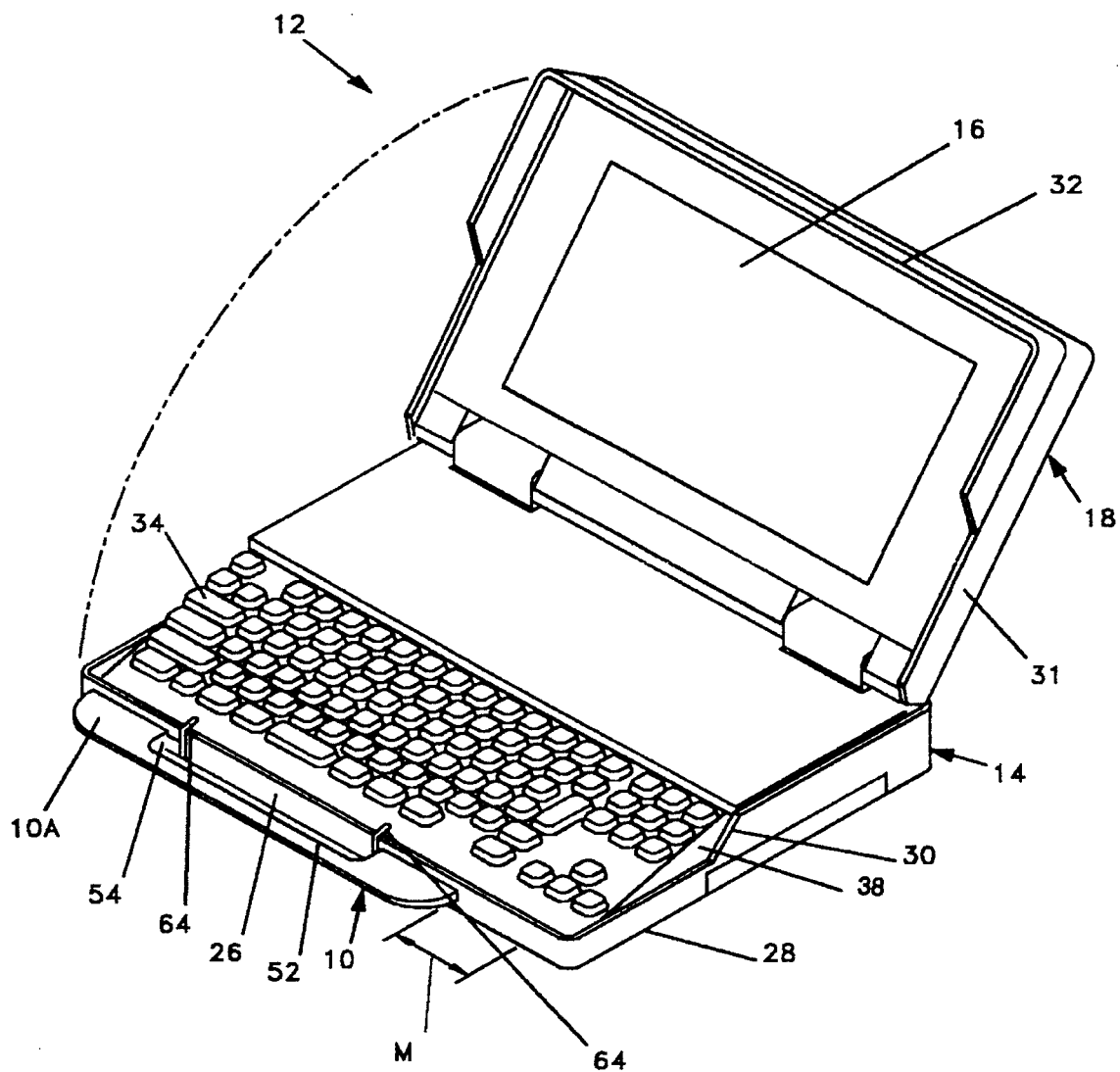
FIG. 1 is a perspective view of a notebook computer with the cover raised and having a palm rest according to one embodiment of the present invention.
Figure 2:
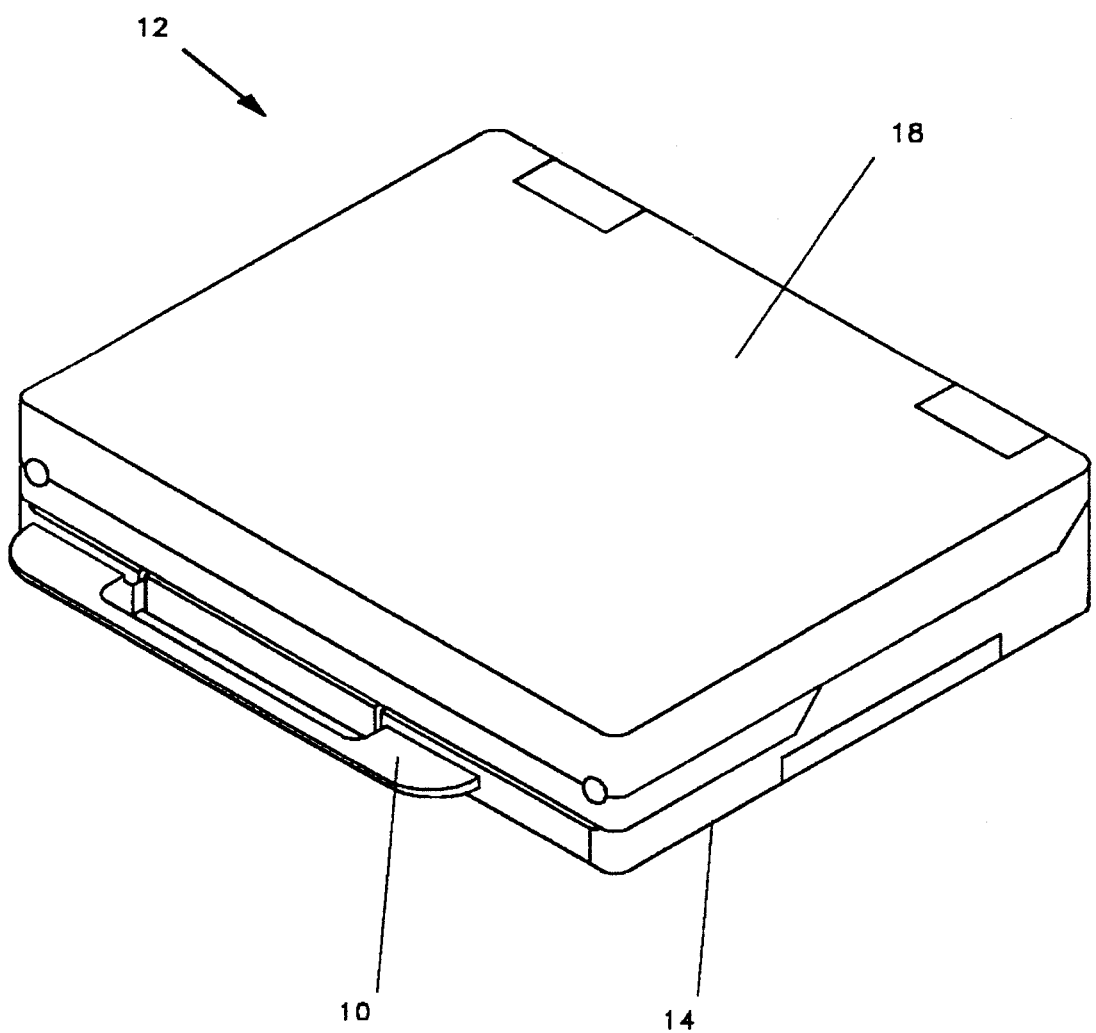
FIG. 2 is a perspective view of the notebook computer of FIG. 1 with the cover closed and the palm rest extended for use as a handle.
Figure 3:
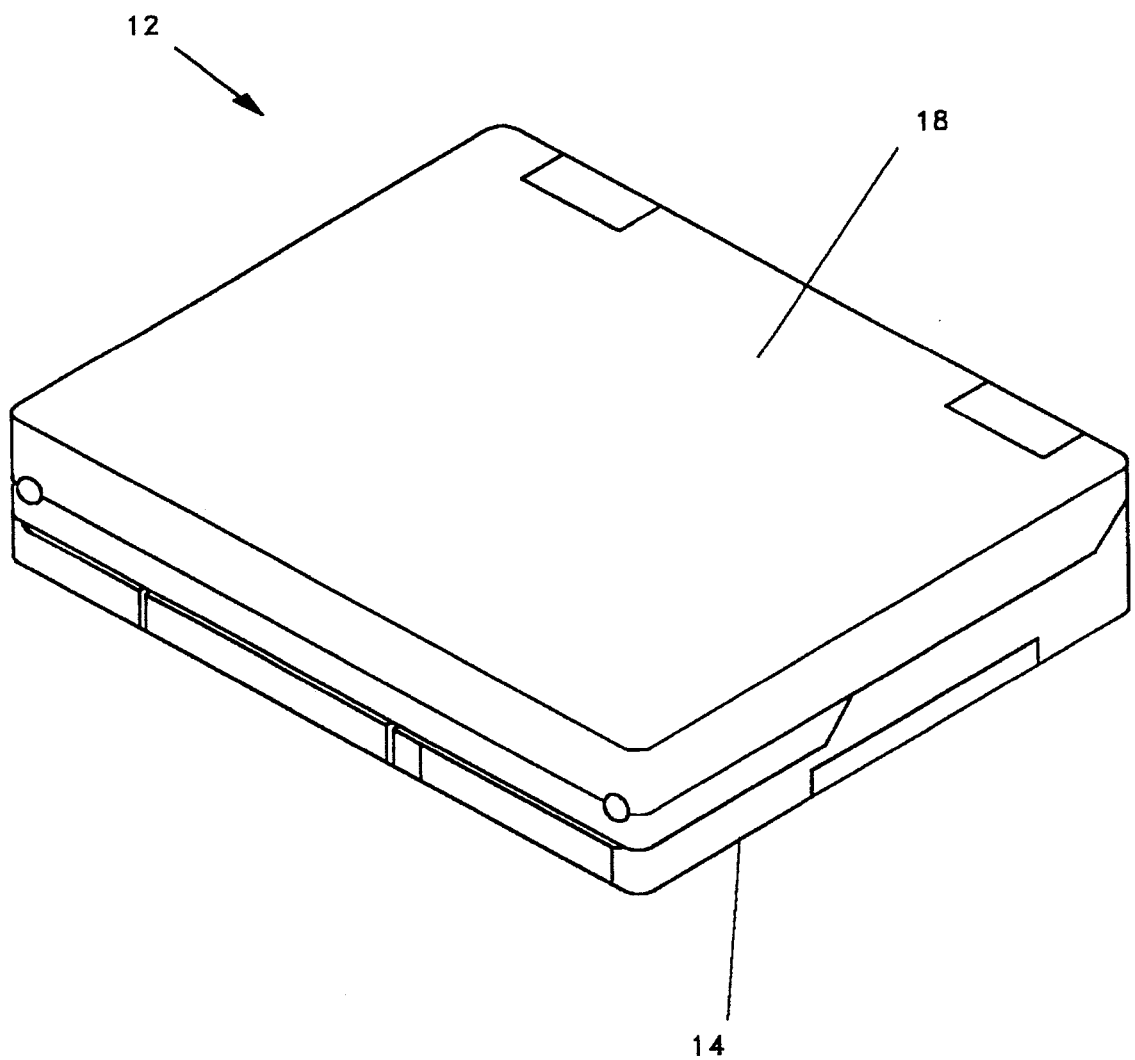
FIG. 3 is a perspective view of the notebook computer of FIG. 1 with the cover closed and the palm rest retracted within the housing.
Figure 4:
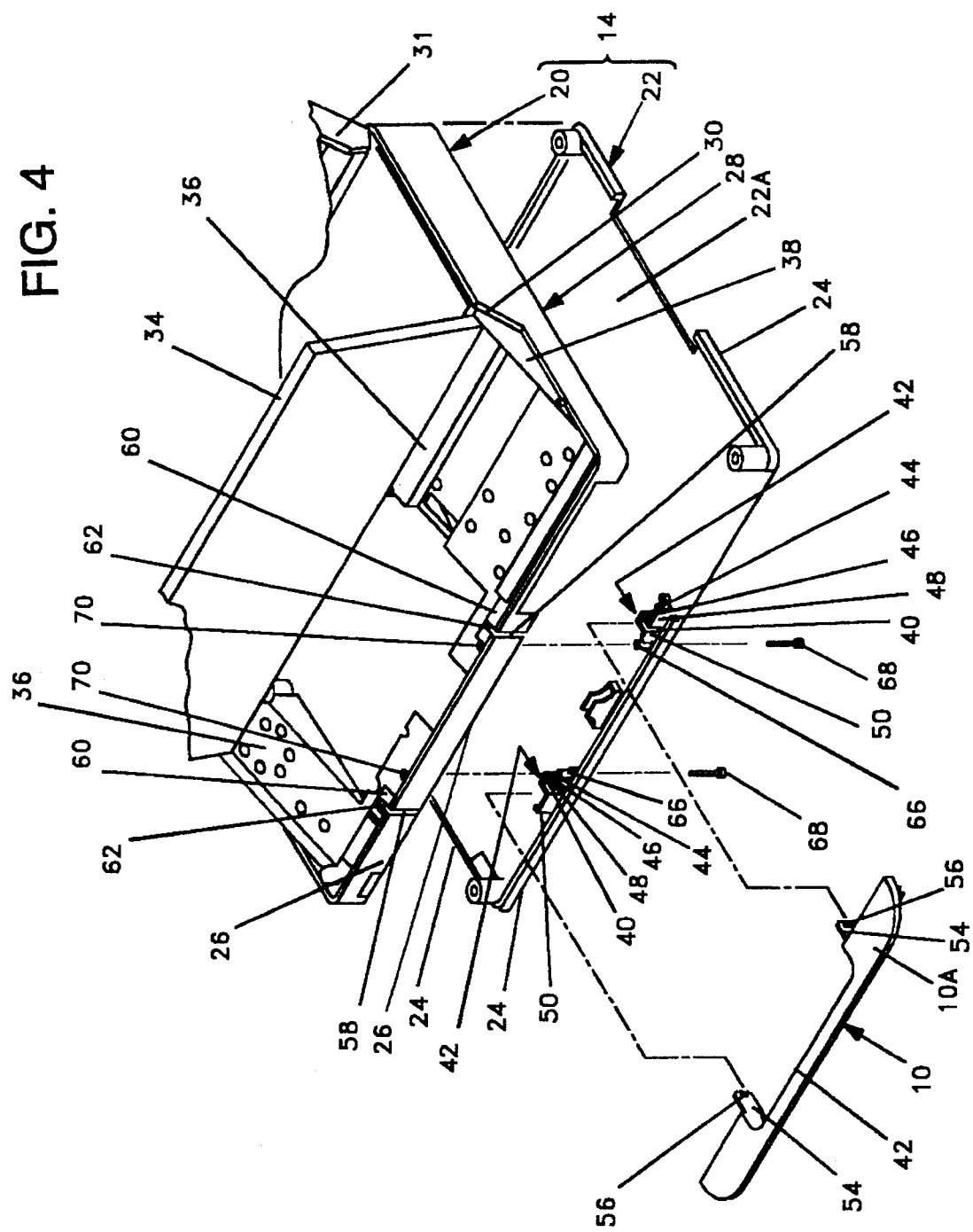
FIG. 4 is an exploded perspective view of a notebook computer having a palm rest according to one embodiment of the present invention.

FIGS. 1 through 3 illustrate a notebook computer 12 having a palm rest 10 according to one embodiment of the present invention. Referring to these figures, the computer 12 includes a substantially rectangular housing 14 having a lid or cover 18, which includes a display 16 and which is so hinged to the housing 14 that it can be opened and closed. The housing 14 includes an upper case 20 and a lower case 22, as is shown in FIG. 4. Various packages and a battery are mounted on a base plate 22A of the lower case 22. Angled members 24 are located around the periphery of the base plate 22A. The angled members 24 engage the bottom ends of the front wall 26 and side walls 28, which are formed by folding the peripheral portions of the upper case 20 downward, so that a hollow storage portion is defined between the upper case 20 and the lower case 22.

The upper edges of side walls 28 are on two levels, an upper level running from the center toward the rear, and a lower level that runs from the center toward the front. A slope 30 is formed at the center of the side walls 28 to connect those two levels. These upper edges of the side walls 28 contact the bottom edge of a circumferential wall 31 of the cover 18 when the cover is closed. As illustrated in FIG. 9, an auxiliary U-shaped frame 32 is provided at the free end of the circumferential wall 31. The lower edge of the auxiliary frame 32 abuts the lower levels of the side walls 28 and the slopes 30, so that a storage space is formed between the cover 18 and the keyboard 34 wherein the palm rest 10 can be stored (see FIG. 8).

As illustrated in FIG. 4, inclined support plates 36 are installed from the midline of the upper case 20 to the front. To cover gaps that appear due to the inclination, a triangular plate 38 is provided at the inside of each side wall 28. The keyboard 34 is attached to the inclined support plates 36, such that the keyboard 34 is inclined toward an operator to facilitate the operation of the keys.

Figure 5:
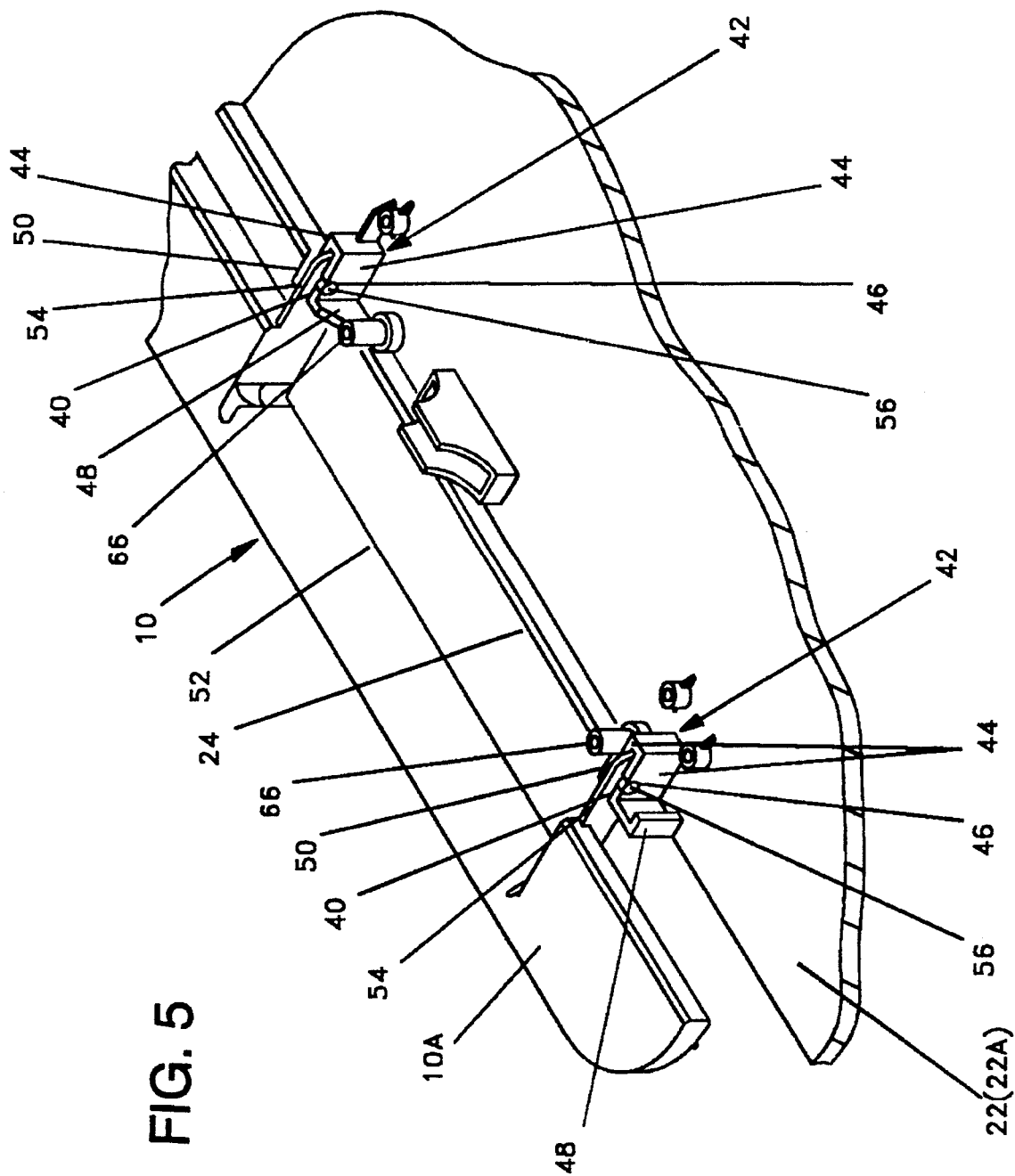
FIG. 5 is a perspective view of the structure that attaches the palm rest to the notebook computer housing, according to one embodiment of the present invention.

As is shown in FIGS. 4 and 5, slits 40 are formed on the front side of the base 22A, and hinge pin receiving members 42 having openings at the top are arranged at a predetermined interval. The upper edges of each leg plate 44 of the hinge pin receiving members 42 are notched to form a semicircular pin receiving groove 46. Ribs 48 and 50 project from the base 22A on both sides of each of the slits 40 to ensure the rigidity of the hinge pin receiving members 42.

Figure 7:
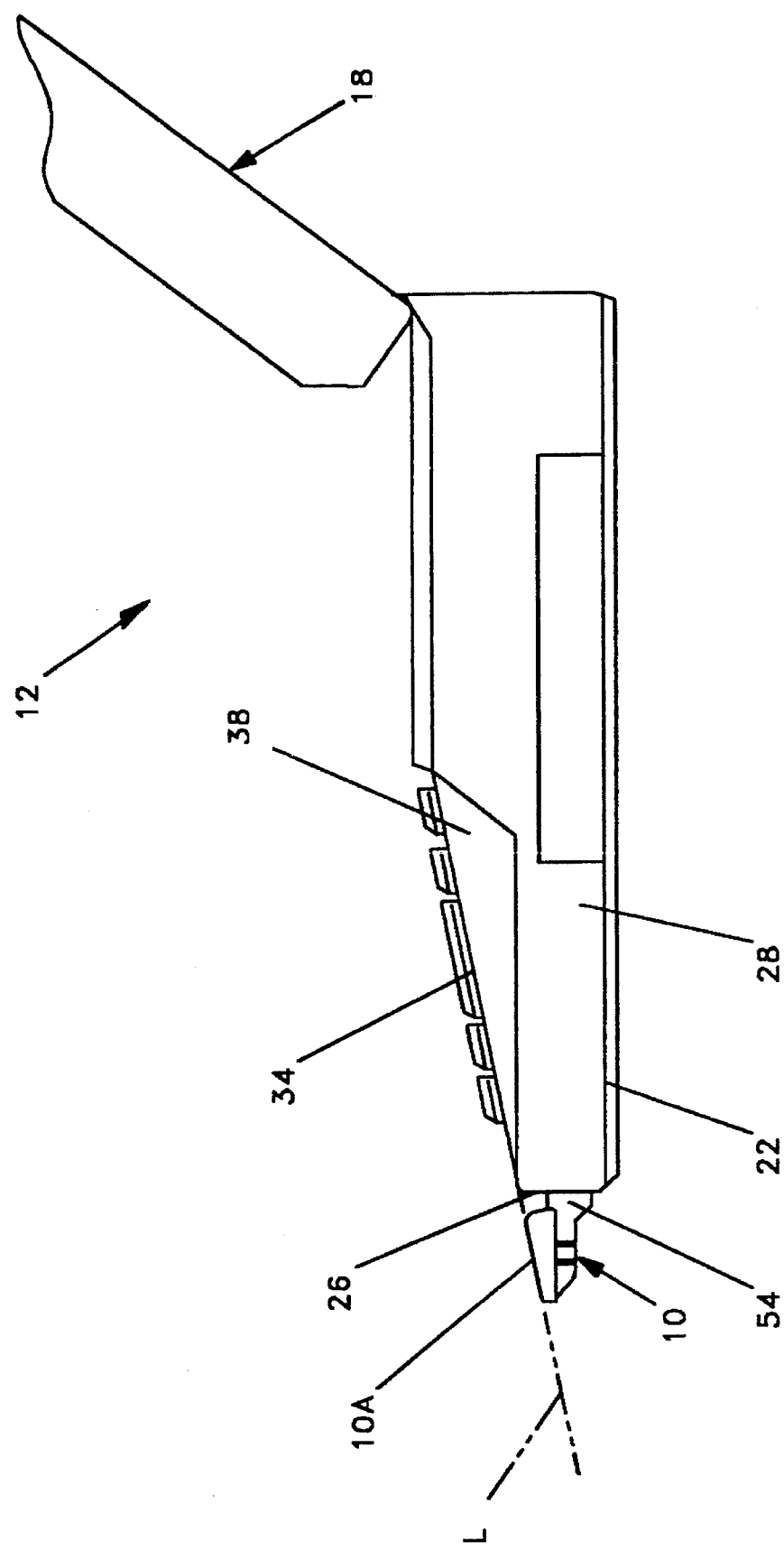
FIG. 7 is a side elevation view of a notebook computer with the cover open and having a palm rest extended for use, according to one embodiment of the present invention.

The palm rest 10, which is an elongated plate, is so designed that when it is rotated forward, its upper or "support" face 10A is at the same angle of inclination as that of the keyboard 34 (see FIG. 7). The center portion of the palm rest 10 is notched to form a rectangular handhold 52 that a user grasps when using the extended palm rest as a handle.

From the longitudinal ends of the handhold 52, arms 54 extend in a direction that is perpendicular to the palm rest 10. Hinge pins 56 are integrally formed at the end of each arm 54 and project outward from both sides of the arms. When the arms 54 are inserted into the hinge pin receiving members 42 through the slits 40, as is shown in FIG. 5, the arms 54 are supported by the hinge pin receiving grooves 46, which are formed in the plates 44. As is shown in FIG. 6, when the palm rest 10 is rotated forward, the bottom faces 54A of the arms 54 abut upon the angled member 24 to restrict the rotation of the palm rest 54, such that the support face 10A is so positioned that it becomes an extension of the upper surface of the keyboard 34.

Figure 8:
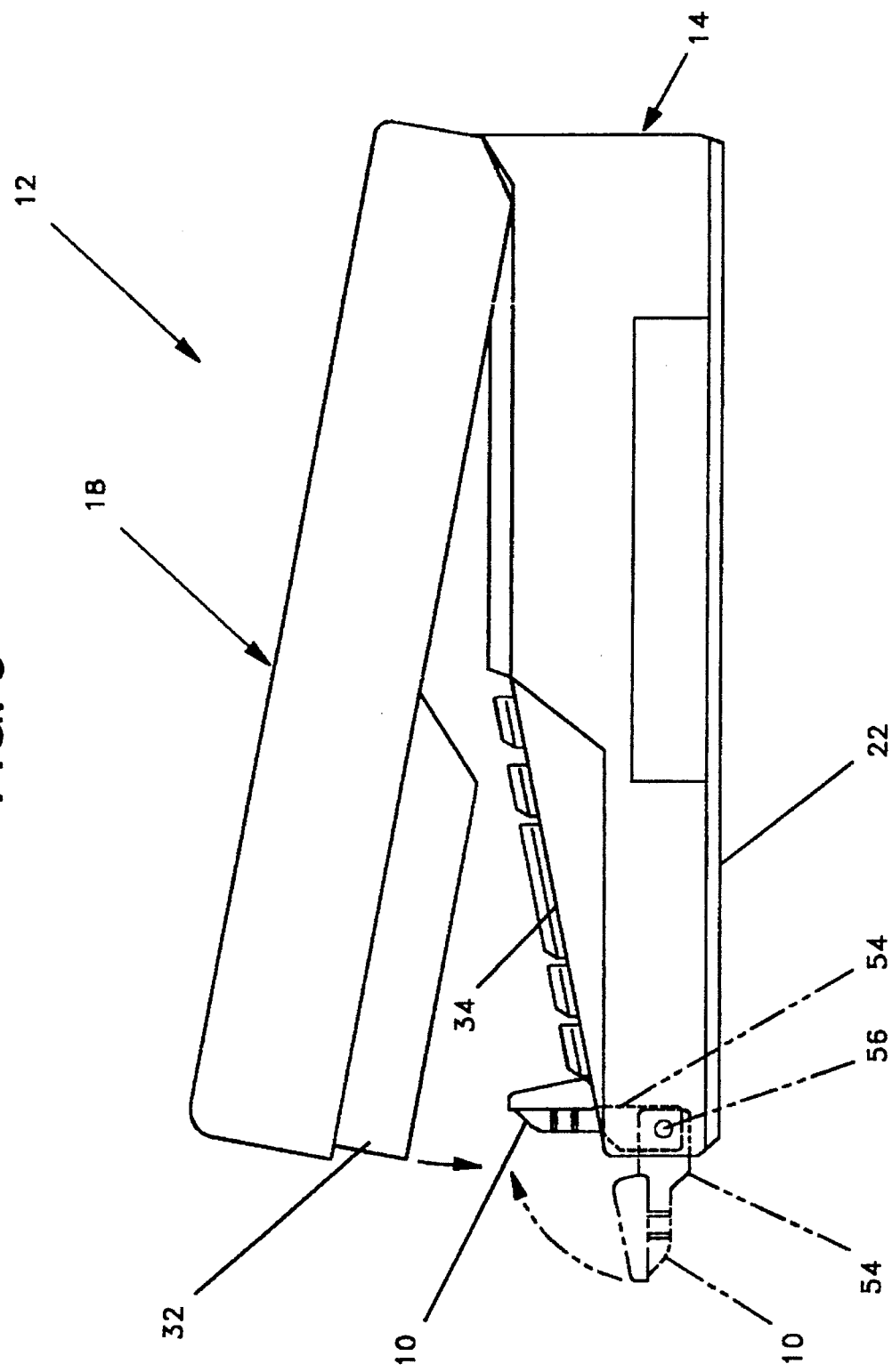
FIG. 8 is a side elevation view of the notebook computer of FIG. 7, with the cover partially closed and the palm rest pivoted into the storage position.
Figure 9:
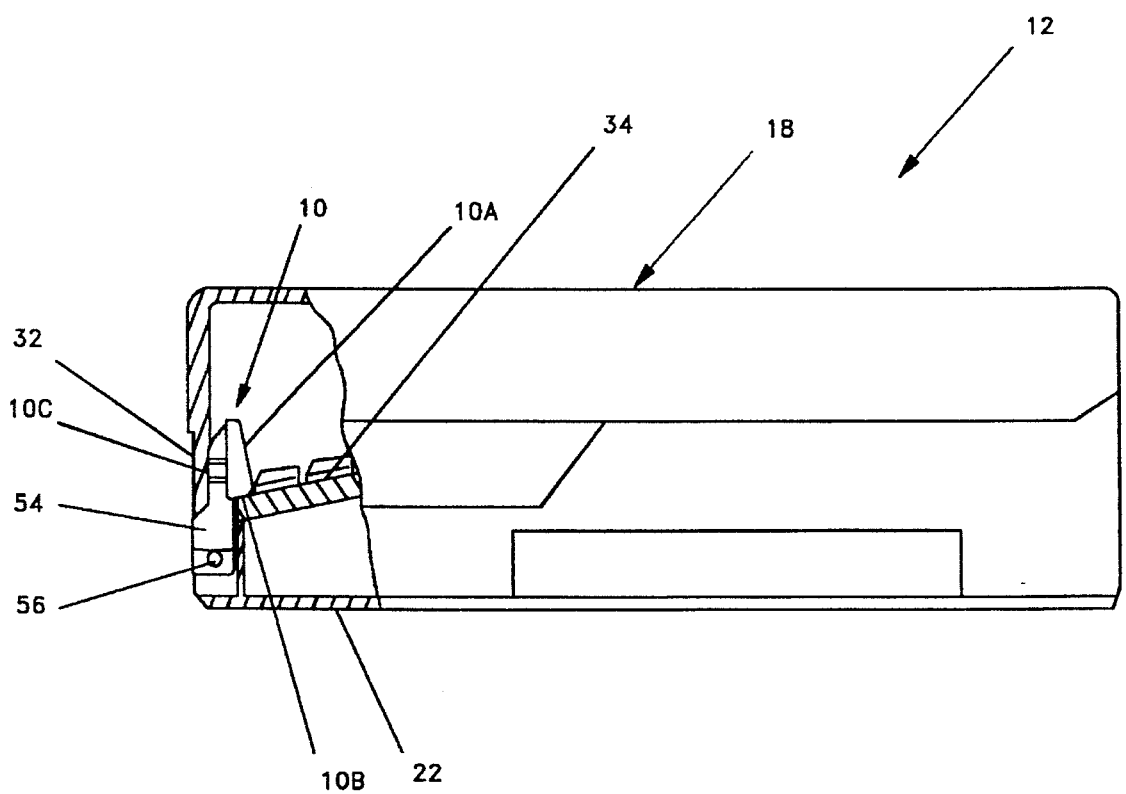
FIG. 9 is a partial cross sectional view of the notebook computer of FIG. 7 with the cover completely closed and the palm rest stored inside the cover.

As is shown in FIGS. 8 and 9, the palm rest 10 is so designed and sized that when it is rotated upright and the cover 18 is closed, the rear face 10B contacts the top surface of the keyboard 34 and the bottom face 10C abuts upon the internal wall of the auxiliary frame 32 such that the palm rest 10 is securely stowed within the cover.

When the upper case 20 is attached to the lower case 22, the vertical slits 58, which are formed in the front wall 26 of the upper case 20, are aligned with the slits 40 in the hinge pin receiving members 42 (see FIG. 4). Horizontal slits 62, which extend inward from the front wall 26, are formed in pressure plates 60 and are aligned with the respective vertical slits 58. Further, slits 64 (see FIG. 1) are aligned with the horizontal slits 62 and are formed in the operator side of the keyboard 34.

Figure 6:
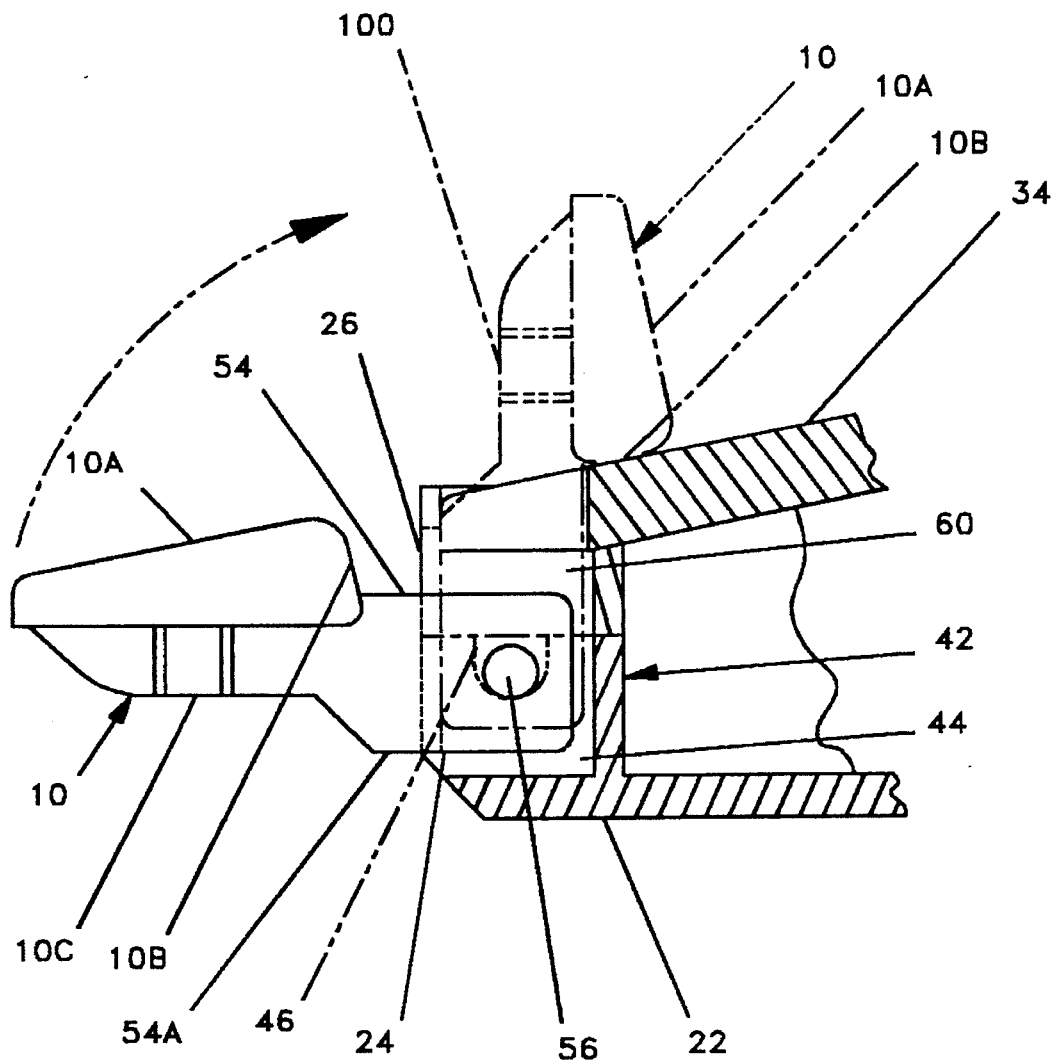
FIG. 6 is a cross sectional view of the attaching structure of FIG. 5.

As is shown in FIG. 6, the hinge pins 56, which are supported by the respective hinge pin receiving grooves 46, are held down by the pressure plates 60. Further, the vertical slits 58, the horizontal slits 62, and the slits 64 permit the palm rest 10 to be pivoted from the reclined position to the upright position at the hinge pins 56.

As is shown in FIGS. 4 and 5, bosses 66 are provided on the base 22A and are open at both ends. Screws 68 are inserted from the bottom of the base 22A and engage respective internal threads 70 provided on the upper case 20 to partially secure the upper and lower cases 20 and 22 together.

The operation of the palm rest will now be described. As is shown in FIGS. 1 and 7, when the computer is to be used, the cover 18 is opened and the palm rest 10 is rotated forward. The bottom faces 54A of the arms 54 contact the angled members 24 of the lower case 22 and hold the palm rest 10 in the reclined position (see FIG. 6). Since the support face 10A of the palm rest 10 and the upper surface of the keyboard 34 lie in the same plane L, an operator can assume a comfortable posture while manipulating the keys. Further, since the palm rest 10 is hinged at the front wall 26 of the housing 14, it is not necessary for both ends of the palm rest to be supported on the side walls of the housing as is done conventionally, and it is also not necessary to extend the palm rest into an area M (see FIG. 1) that lies beyond the typing area.

As illustrated in FIG. 2, the palm rest also functions as a carrying handle by simply closing the cover 18 while the palm rest 10 is in the reclined or extended position. To carry the computer, a user simply slips his or her fingers under the handhold 52.

To store the computer, e.g., in a desk drawer, the palm rest 10 is rotated around the hinge pins 56 until it is upright and until the rear face 10B of the palm rest 10 contacts the top face of the keyboard 34, whereupon rotation is stopped. When the cover 18 is closed, the internal wall of the auxiliary frame 32 contacts the bottom face 10C of the palm rest 10 to hold the palm rest 10 securely in place.

The use of the a palm rest 10 that pivots rather than slides simplifies the mechanism, reduces the number of individual parts, and does not require precision manufacturing. Therefore, manufacturing costs are significantly reduced when compared to slidable palm rests. Since the palm rest pivots upward for storage within the cover of the computer, the palm rest does not extend beyond the boundaries of the computer's housing, thereby maintaining the same "footprint". Further, as the palm rest is hinged on the front wall of the computer, the width of the pivotal palm rest may be less than that of the slidable palm rest, because its width does not have to extend all the way to the side walls 28 of the housing.

I claim:

1. A palm rest, which is installed into a data processing apparatus having a case assembly with a keyboard and a lid, said palm rest being rotatably hinged on said case assembly, being capable of holding an operator's palms when rotated outward, being covered with said lid when said lid is closed, and forming a handle when said palm rest is rotated outward and said lid is closed.

2. A palm rest according to claim 1, wherein the surface of said palm rest on which said operator's palms are to be rested is on the same plane as that formed by said keyboard.

3. A palm rest according to claim 1, which is hinged on the front wall of said case assembly.

4. A palm rest according to claim 1, which can be held upright and held in contact with the internal wall of said lid when said lid is closed.

5. A data processing apparatus, having a case assembly mounting a keyboard and a lid, further comprising:
a palm rest, being rotatably hinged on said case assembly, being capable of holding an operator's palms when rotated outward, being storable upright in said lid when said lid is closed, and forming a handle when said palm rest is rotated outward and said lid is closed.

6. A data processing apparatus according to claim 5, wherein the surface of said palm rest on which said operator's palms are to be rested is on the same plane as that formed by said keyboard.

7. A data processing apparatus according to claim 5, wherein said palm rest is hinged on the front wall of said case assembly.

8. A data processing apparatus according to claim 5, wherein said palm rest can be held upright and held in contact with the internal wall of said lid.

* * * * *